United States Patent [19]
Peterson

[11] 3,749,017
[45] July 31, 1973

[54] PARACHUTE RETARDING TAIL ASSEMBLY FOR BOMB
[75] Inventor: Carl R. Peterson, Silver Spring, Md.
[73] Assignee: The United States of America as represented by the Secretary of the Navy, Washington, D.C.
[22] Filed: Dec. 7, 1971
[21] Appl. No.: 205,534

[52] U.S. Cl. .................. 102/4, 102/35.6, 244/147
[51] Int. Cl. ............................................. F42b 25/02
[58] Field of Search .................. 89/1.5, 1.5 D; 102/4, 147, 35.6; 244/138, 142

[56] References Cited
UNITED STATES PATENTS
3,299,810   1/1967   Robert .................................. 102/4
3,625,106  12/1971   Russo et al. ...................... 89/1.5 D
3,492,911   2/1970   Adams ............................... 89/1.5 D Primary Examiner—Samuel W. Engle
Attorney—R. S. Sciascia, U. A. Cooke et al.

[57] ABSTRACT

A drop bomb usable in a retarded and an unretarded mode at the option of the aircraft pilot, having tail fins and a parachute within a cannister in the tail section. The parachute may be deployed for the retarded mode by retaining at the aircraft a lanyard attached to an arming wire associated with a ball lock release mechanism which holds a spring loaded cover on the parachute cannister. For the unretarded deployment, the lanyard is not retained at the aircraft, but falls with the bomb and the ball lock mechanism is not activated.

4 Claims, 2 Drawing Figures

INVENTOR.
CARL R. PETERSON

PARACHUTE RETARDING TAIL ASSEMBLY FOR BOMB

BACKGROUND OF THE INVENTION

This invention relates generally to aircraft-deployed drop bombs and more particularly to a drop bomb which may be deployed in a retarded or an unretarded mode by the option of the pilot before launch. A tail section having fins and an internal cannister or chamber contains a parachute which may be deployed by the pilot by actuating a ball release mechanism when the drop bomb is launched from the aircraft.

Several methods have been heretofore proposed to retard the fall of the drop bomb to its target such as deployable parachutes and laterally extending fins which act as dive brakes in the air stream or aerodynamic fins which cause rotation of the drop bomb and the fins act like helicopter blades. The obvious utility of a retarded drop bomb is to permit its launching from a high speed aircraft to a target below or slightly ahead of the aircraft. The retarding means will reduce the lateral inertia imparted to the drop bomb by the aircraft to produce a more vertical descent.

A further method shown in the art for retarding the rate of descent of a missile is for delivering a missile such as a torpedo into the water without damage so that it may make its run underwater to a distant target. This tactic uses a parachute for the airdrop and a quick release mechanism for disposal of the parachute upon contact with the water.

None of the devices of the prior art, however, are usable to produce a retarded mode as well as an unretarded mode at the option of the pilot of the delivery vehicle at the instant of launch of the drop bomb. Another shortcoming of the present devices is the fact that there is no simple parachute release mechanism which allows the drop bomb to fall clear of the delivery vehicle before deployment of its retarding parachute.

SUMMARY OF THE INVENTION

Accordingly, one object of this invention is to provide a drop bomb capable of use in a retarded and unretarded mode.

Another object of the invention is to provide a drop bomb usable in a retarded and an unretarded mode at the option of a pilot at the instant of launch.

Still another object of the present invention is to provide a drop bomb having a readily deployable parachute.

Briefly, these and other objects of the present invention are obtained by the use of a drop bomb tail section having stabilizing fins in a cruxiform pattern and a concentric chamber inside the finned area which contains one or more parachutes. In the retarded mode, the parachute is deployed by the removal of a rear cover releasably secured by a ball lock mechanism. The ball lock mechanism is actuated by the removal of arming wire or lanyard which is releasably attached to the aircraft. The pilot of the aircraft has the option of retaining the arming wire on the aircraft or dropping it with the bomb. If retained to the aircraft, the arming wire is withdrawn from the bomb as it falls away from the aircraft, thus actuating the ball lock mechanism. Releasing the ball lock mechanism permits spring ejection of the rear cover which is attached to the parachute to thus draw it out of the cannister and create a retarding canopy. If the pilot desires to use the bomb in the unretarded free-fall mode, the arming wire lanyard is released from the aircraft at the same time that the bomb is dropped.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
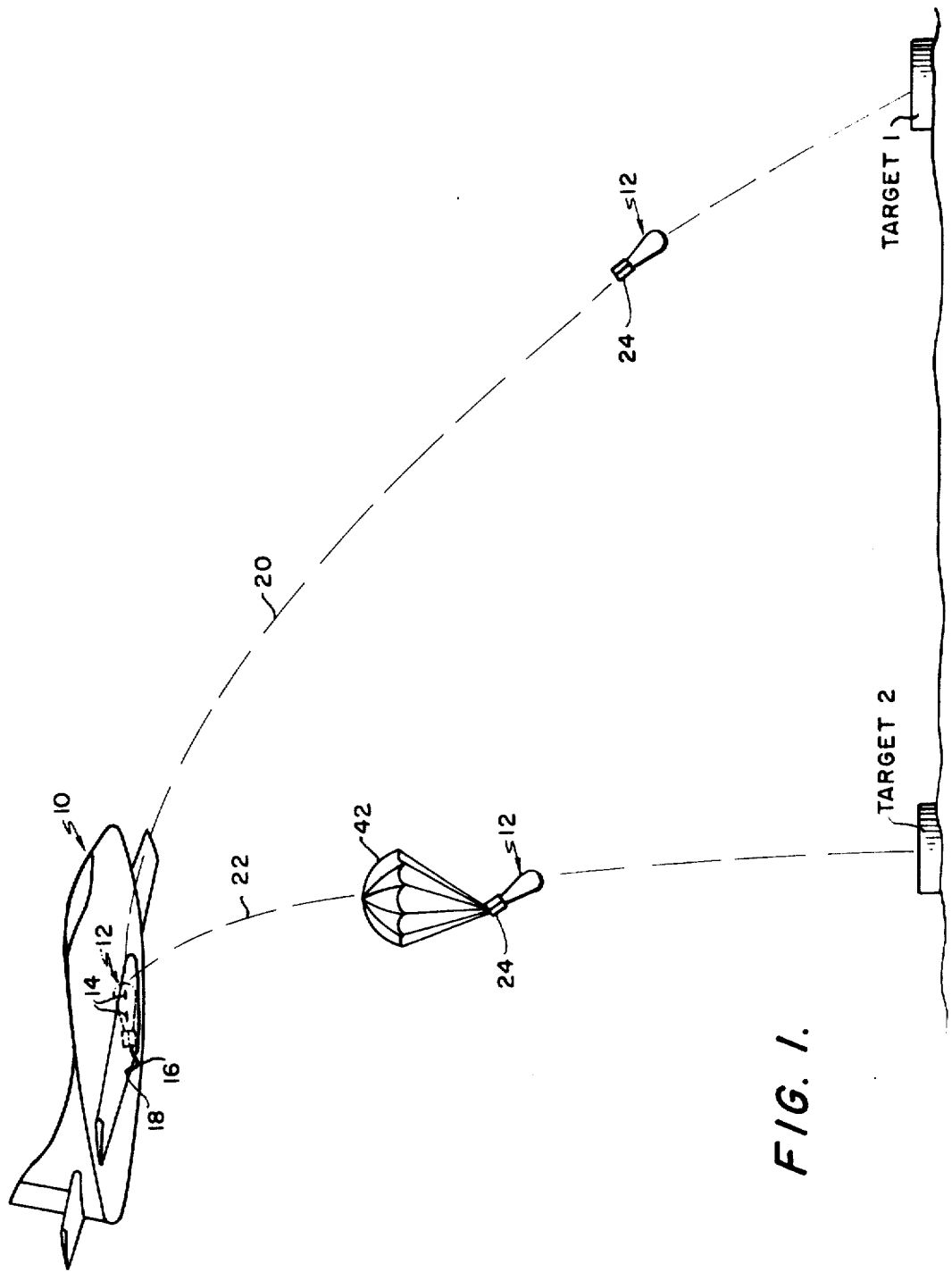
FIG. 1 is a pictorial view showing the general concept including the delivery aircraft and drop bomb.

Referring now to the drawings, wherein like reference numerals designate corresponding parts in the several views, there is shown in FIG. 1 generally a delivery aircraft 10 having mounted thereon a drop bomb 12 attached by appropriate release hooks 14. Attached to an after end of the drop bomb 12 is an arming wire lanyard 16 leading away from the drop bomb and releasably attached to the aircraft 10 to a pilot actuatable solenoid latch 18. FIG. 1 also shows an unretarded trajectory 20 and a retarded mode trajectory 22 wherein a parachute 42 is deployed behind the drop bomb 12.

Figure 2:
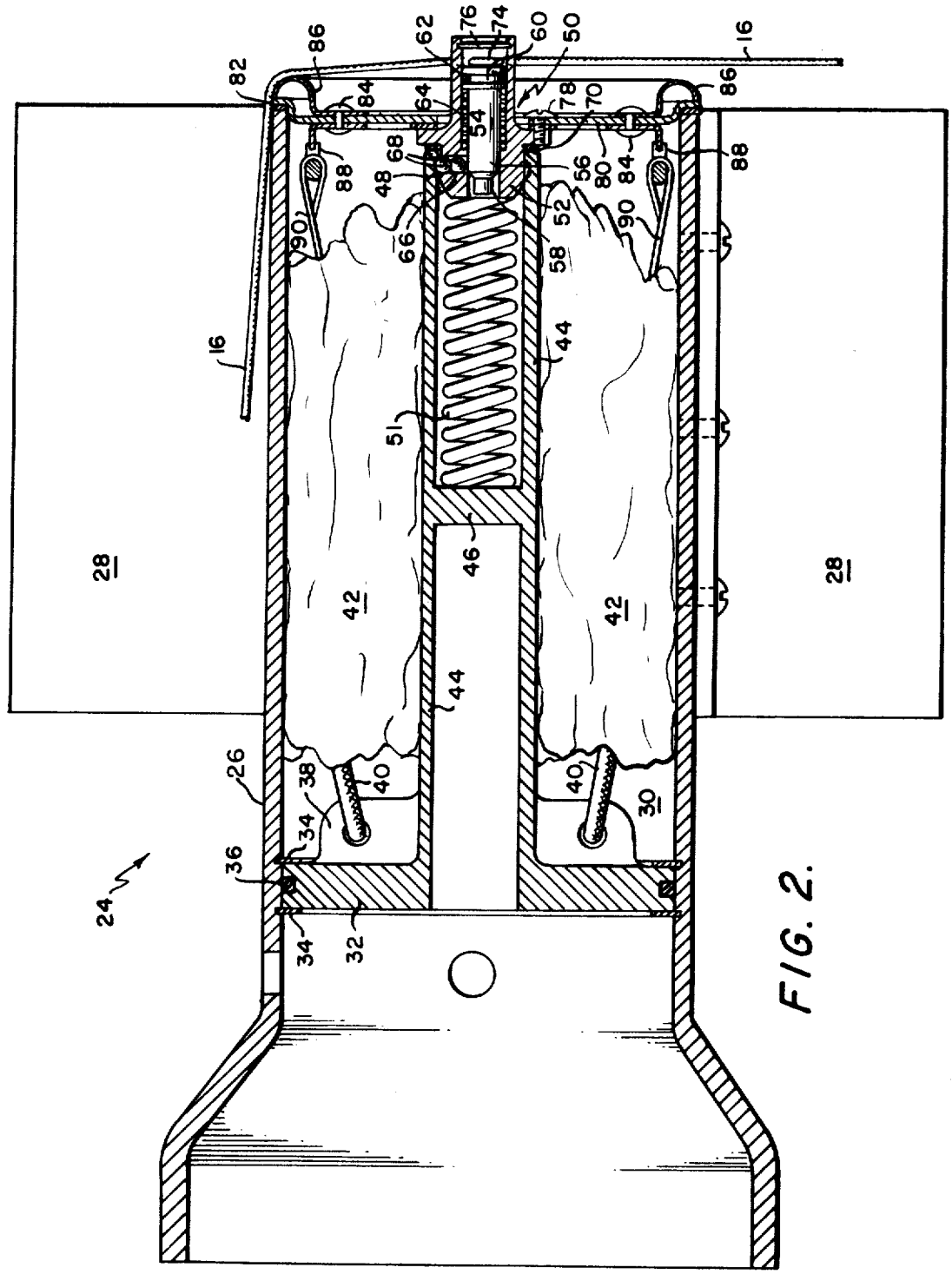
FIG. 2 is a side view in partial section of the tail section of the drop bomb according to the present invention.

Referring now to FIG. 2, there is shown generally a tail section 24 of the drop bomb 12. Tail section 24 comprises a tubular structure 26 having attached thereto a plurality of fins 28. At the forward end of the tubular structure 26 and forming a closed tubular chamber 30, is a bulkhead 32 rigidly affixed by a pair of retaining rings 34 and sealed against moisture and dust by an O-ring 36. Integrally formed with the bulkhead 32 are a plurality of pad eyes 38 having holes therethrough. Through the holes in pad eyes 38 are threaded parachute shroud cords 40 which are coiled or flaked down and attached to a parachute 42 as is well known in the parachute rigging art. Also, integrally formed with the bulkhead 32 and pad eyes 38 is a tube 44 which extends aft and concentrically within the tubular chamber 30. As is shown in FIG. 2, tube 44 extends to near the after end of chamber 30 and its internal diameter is interrupted by a web 46. At the rear end of tube 44, there is formed an internal annular groove having a sharp inner shoulder and a chamfered outer shoulder.

Within the diameter of tube 44 is contained a plug portion 52 of a ball lock mechanism 50 having a blunt forward end. Included in the ball lock mechanism 50 is a plunger 54 in sliding relationship within an axial bore of the plug 52. Plunger 54 has a major diameter 56 and a reduced diameter 58 for engaging a set of balls 68. Balls 68 are contained within radial holes 66 bored equiangularly spaced about the center of the plunger 52. There may be three or four such radially bored holes for containing each set of balls 68. At the rear end of the plunger 54 is formed a piston 60 having an annular groove for containing an O-ring 62 in sliding relationship with a larger axial bore in the plug 52. A helical compression spring 64 surrounds the plunger 54 and biases it in a rearward direction. An O-ring 70 forms a seal between the end of the tube 44 and the plug portion 52 of the ball lock mechanism 50. Retaining the spring 64 in the compressed position as shown, and therefore the plunger 54 in a forward position where the major diameter 56 is in contact with the balls 68, is an arming wire lanyard 16 threaded through a cross hole 74 at the rear of the plug 52. A stop 76 is provided at the far end of the plug 52 to retain the plunger 54 after the arming wire lanyard 16 has been withdrawn. Attached to the ball lock mechanism 50, as for example by fasteners 78, is a cover plate 80 having a diameter sufficient to engage the rear end portion of the tubular structure 26. Interposed between the cover 80 and the tubular structure 26 is an O-ring 82 for sealing purposes. Attached to the cover plate 80, as for example by rivet fasteners 84, is a fairing ring 86 precluding sharp bends in the arming wire 16 and permitting easy withdrawal from cross hole 74. Also attached by rivet fasteners 84 are a plurality of lugs 88 having attached thereto a plurality of parachute deployment cords 90.

As now will be readily apparent, the entire structure discussed herein including the bulkhead 32 including the tube 44, the ball lock mechanism 50, the parachute 42, and the end cover 80 may be in a separate cannister contained and suitably secured within the main tubular tail structure 26 so that if a bombing sortie is planned not requiring the use of bombs in a retarded mode, the parachute and the release mechanism need not be installed and may be saved for future use. Furthermore, it is readily apparent that the tail section 24 may be replaced by another not containing the parachute and release mechanism and affixed to the main section of the bomb.

In operation, and referring to FIGS. 1 and 2, the pilot of aircraft 10 has the option to release the drop bomb 12 in either the unretarded mode having a trajectory 20 or the retarded mode having trajectory 22 wherein the parachute 42 is deployed from the tail section 24. If the unretarded mode is desired, the pilot, at the same time he releases the drop bomb, actuates the solenoid latch 18 opening it and freeing the arming wire 16. The arming wire 16 therefore remains through the cross hole 74 of the ball lock mechanism 50 thus precluding the rearward movement of the plunger 54 and therefore the rear cover 80 and the parachute 42 are not deployed.

If the pilot desires to release the drop bomb 12 in the retarded mode, he releases the drop bomb 12 from the underwing hooks 14, but does not actuate the solenoid latch 18. Therefore, as the drop bomb 12 falls away from the aircraft 10, the arming wire 16 is pulled out from the cross hole 74 in the ball lock mechanism 50. The plunger 54 is then free to translate to the rear under the influence of compression spring 64. With the plunger 54 in the rearward position, the reduced diameter 58 is now adjacent the balls 68 contained within the radially bored holes 66. Under the spring force developed by the deployment spring 51 within the tube 44, the balls 68 are cammed inwardly on the chamfered surface of the angular groove 48 formed inside the tube 44. The plug end 52 of the ball release mechanism 50 is therefore readily forced out along with the attached cover plate 80 and the lugs 88 attached thereto. This forceable ejection by the deployment spring 51 causes the deployment cords 90 attached to the parachute 42 to be pulled out a distance from the tail section 24 into the air stream. The cover 80, when subjected to the air stream, acts as a pilot chute drawing the deployment cords 90 and the parachute 42 further out of the chamber 30 and into the air stream where the parachute opens to retard the speed of the drop bomb 12 as can be seen in FIG. 1. The parachute may be of the open cross panel type or any type of parachute that can withstand high opening velocities in the order of 500 to 600 knots imparted by the delivery aircraft.

It will be apparent that the apparatus of the herein described invention achieves the result of a drop bomb which may be deployed in a retarded or unretarded mode at the option of the pilot. It will also be apparent that the ball lock mechanism may be any other type such as for example an explosive bolt arrangement or a ball lock mechanism wherein the plunger may be translated by an explosive charge actuated by the pilot within the aircraft.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A parachute retardable drop bomb adapted to be released from a delivery aircraft comprising:
   a finned tail section connectable to the after end of the drop bomb;
   a chamber formed within said finned tail section;
   parachute means stowed in said chamber;
   a removable cover closing the after end of said chamber;
   a separable bulkhead forming the forward end of said chamber;
   an aft extending tube attached centrally to said bulkhead;
   a spring contained in said aft extending tube for biasing said cover away from said chamber;
   a ball lock mechanism connected to and releasably retaining said cover in a closed relationship with said chamber;
   an arming wire lanyard removably connected at one end to and securing said ball lock mechanism in a locked condition; and
   a connection on the delivery aircraft releasably attached to the other end of said arming wire lanyard for the controllable release thereof at the option of the delivery vehicle's pilot.

2. The parachute retardable drop bomb of claim 1 wherein said ball lock mechanism further comprises:
   a cylindrical plug member having a spherically shaped nose portion within said aft extending tube;
   a plunger axially and slidably contained within said plug member having a major diameter and a reduced diameter;
   a plurality of balls contained in equi-angular spaced radially bored holes biased to a position outside the diameter of said plug member when in contact with the major diameter of said plunger and to a position inside the diameter of said plug member when in contact with the reduced diameter; and
   a spring biasing said plunger to a position where the reduced diameter would be adjacent said balls but held in a position where the major diameter is adjacent said balls by said arming wire lanyard.

3. The parachute retardable drop bomb of claim 1 further comprising:

a cannister slidably fit to and contained within the walls of said chamber and connected to said bulkhead for ready removal of the entire parachute retarding system.

4. The parachute retardable drop bomb of claim 1 further comprising:

a fairing rim mounted on the outside rim of said removable cover.

* * * * *